(12) United States Patent
Voorhies et al.

(10) Patent No.: US 11,092,973 B2
(45) Date of Patent: Aug. 17, 2021

(54) COORDINATED OPERATION OF AUTONOMOUS ROBOTS

(71) Applicant: inVia Robotics, Inc., Westlake Village, CA (US)

(72) Inventors: Randolph Charles Voorhies, Culver City, CA (US); Lior Elazary, Agoura Hills, CA (US); Daniel Frank Parks, II, Los Angeles, CA (US); William Shane Simpson Grant, Van Nuys, CA (US)

(73) Assignee: inVia Robotics, Inc., Westlake Village, CA (US)

( * ) Notice: Subject to any disclaimer, the term of this patent is extended or adjusted under 35 U.S.C. 154(b) by 369 days.

(21) Appl. No.: 16/146,530

(22) Filed: Sep. 28, 2018

(65) Prior Publication Data

US 2020/0103921 A1    Apr. 2, 2020

(51) Int. Cl.
*G05D 1/02* (2020.01)
*G05D 1/00* (2006.01)

(52) U.S. Cl.
CPC ......... *G05D 1/0291* (2013.01); *G05D 1/0088* (2013.01); *G05D 1/0217* (2013.01); *G05D 2201/0216* (2013.01)

(58) Field of Classification Search
CPC .. G05D 1/0291; G05D 1/0088; G05D 1/0217; G05D 2201/0216
See application file for complete search history.

(56) References Cited

U.S. PATENT DOCUMENTS

| 2013/0096713 | A1* | 4/2013 | Takizawa | B65G 61/00 700/224 |
| 2014/0365258 | A1* | 12/2014 | Vestal | G06Q 10/063114 705/7.15 |
| 2016/0132059 | A1* | 5/2016 | Mason | G05D 1/0246 701/28 |
| 2018/0074516 | A1* | 3/2018 | Ogawa | G05D 1/0094 |
| 2019/0049975 | A1* | 2/2019 | Kattepur | G06Q 10/087 |
| 2019/0196497 | A1* | 6/2019 | Eoh | G01C 21/32 |

FOREIGN PATENT DOCUMENTS

CN        107036618 A  *  8/2017

* cited by examiner

*Primary Examiner* — Hunter B Lonsberry
*Assistant Examiner* — Elizabeth Yang
(74) *Attorney, Agent, or Firm* — Ansari Katiraei LLP; Arman Katiraei; Sadiq Ansari

(57) ABSTRACT

Coordinated operation of two or more autonomous robots is based on a clustered partitioning of a collective set of operations and/or tasks that the robots perform simultaneously. The clustered partitioning may include generating a set of clusters with each cluster of the set of clusters allocating a different subset of the collective set of operations and/or tasks to a different robot such that the set of clusters results in a least amount of cumulative distance that the robots traverse in performing each operation and/or task of the collective set, and a maximum amount of distance separating the robots when performing each operation and/or task. Each cluster may be assigned to a different robot with the collective set of assigned clusters causing the robots to operate and move in a coordinated efficient and nonconflicting manner.

19 Claims, 12 Drawing Sheets

COORDINATED OPERATION OF AUTONOMOUS ROBOTS

TECHNICAL FIELD

The present invention relates to the technical field of robotics.

BACKGROUND INFORMATION

An autonomous robot may use one or more onboard sensors, actuators, motors, mechanical components, processors, and/or algorithms to perform various tasks independently and in an automated manner. Greater robotic sophistication is needed when a robot performs tasks that involve interactions with other robots, humans, or shared resources. For instance, multiple robots operating independently in the same environment may experience deadlocks (e.g., robots blocking each other's movements), obstacles that create delays (e.g., robots halting or slowing operation to move around another robot), traffic, congestion, unavailable resources (e.g., resource temporarily being accessed by another robot), other issues that may arise from interactions with other robots, and/or other issues that may arise from robots accessing the same set of shared resources in a common environment.

There is therefore a need to coordinate the operations of robots operating in a common environment in order to reduce or eliminate the inefficiencies that arise when the robots operate independently and do not account for operations and movements of other robots. More specifically, there is need to coordinate the operation of autonomous robots in order to optimize the space in which the robots operate and the resources with which the robots operate. Consequently, the collective set of tasks performed by a set of robots can be completed more quickly and at lower cost than if each robot was to complete a subset of the collective set of tasks without accounting for what other robots are doing.

DETAILED DESCRIPTION OF PREFERRED EMBODIMENTS

The following detailed description refers to the accompanying drawings. The same reference numbers in different drawings may identify the same or similar elements.

Systems and/or methods, as described herein, provide coordinated operation of two or more autonomous robots. In some embodiments, the coordinated operation may be based on a clustered partitioning of a collective set of operations and/or tasks, and each robot simultaneously performing the operations and/or tasks of a different cluster with the clusters coordinating robot movements and operations in a nonconflicting optimal manner.

The clustered partitioning may include dynamically generating clusters for parallel sets of operations and/or tasks that minimize the total distance and/or time for the robots to complete the operations and/or tasks of the collective set of clusters, that equalize the total work performed by each robot, and/or that maximize the distance between the clusters so that the difference in time at which different robots access the same or related resource or space is maximized. Each cluster may be assigned to a different robot with the collective set of assigned clusters causing the robots to operate and move in a coordinated efficient and nonconflicting manner.

In some embodiments, the coordinated operation is provided for a set of order fulfillment robots that operate in a common environment for simultaneous and parallel object retrieval. In some such embodiments, the clusters are dynamically formed based on positioning of the collective set of objects to retrieve, positioning of the available robots, source-to-destination distance and/or time associated with each retrieval, and/or operational characteristics of the robots. The cluster-based coordinated operation may increase robot efficiency by maximizing the number of objects that are retrieved by the collective set of robots in a given amount of time. Stated differently, the cluster-based coordinated operation may increase robot efficiency by minimizing the collisions between the robots, reducing wasted distance traversed by the robots, and ensuring that the robots complete the tasks at or near the same time so no one robot is responsible for delaying the completion of a global set of tasks.

Figure 1:
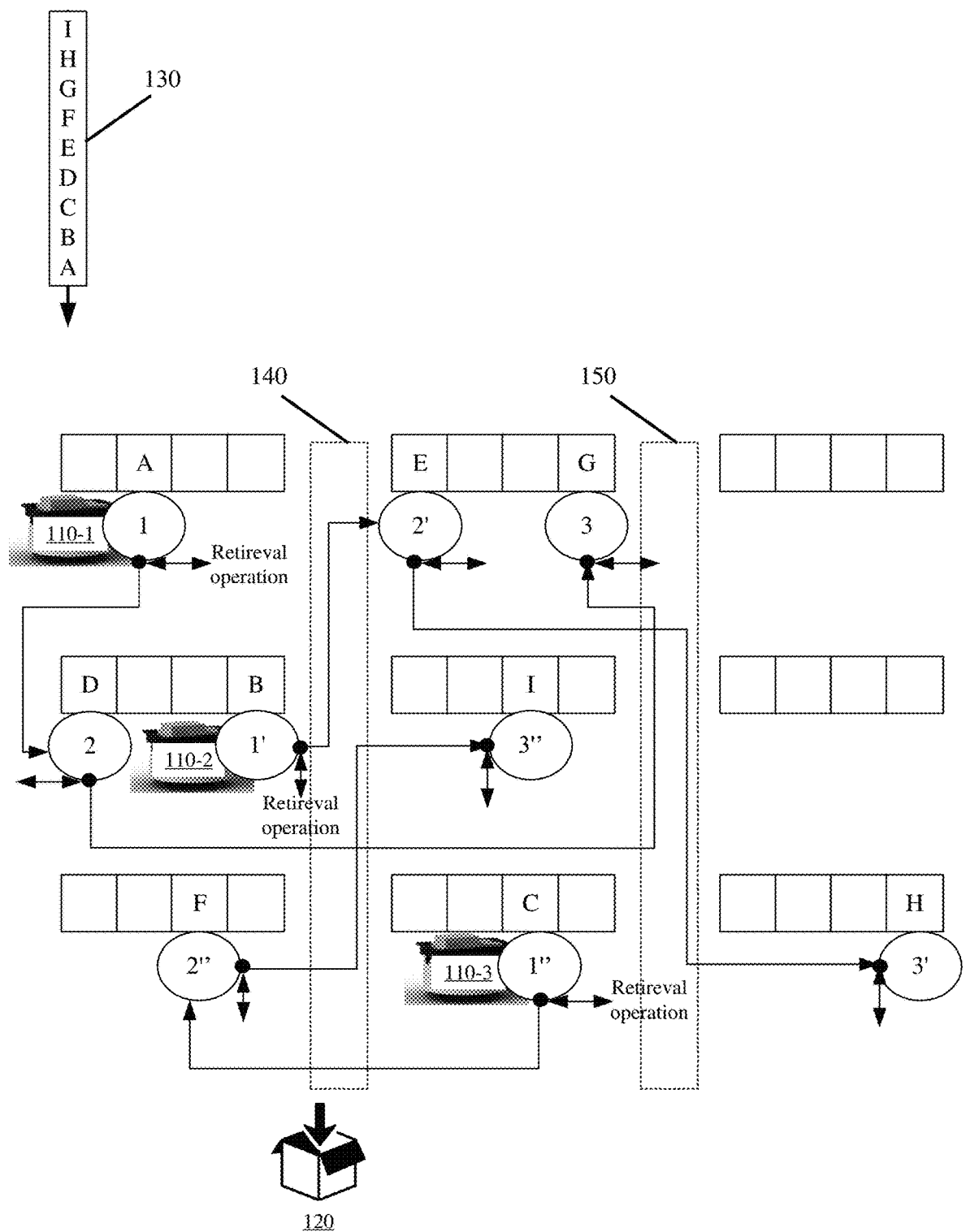
FIG. 1 presents an example of uncoordinated and/or independent robot operation.
Figure 3:
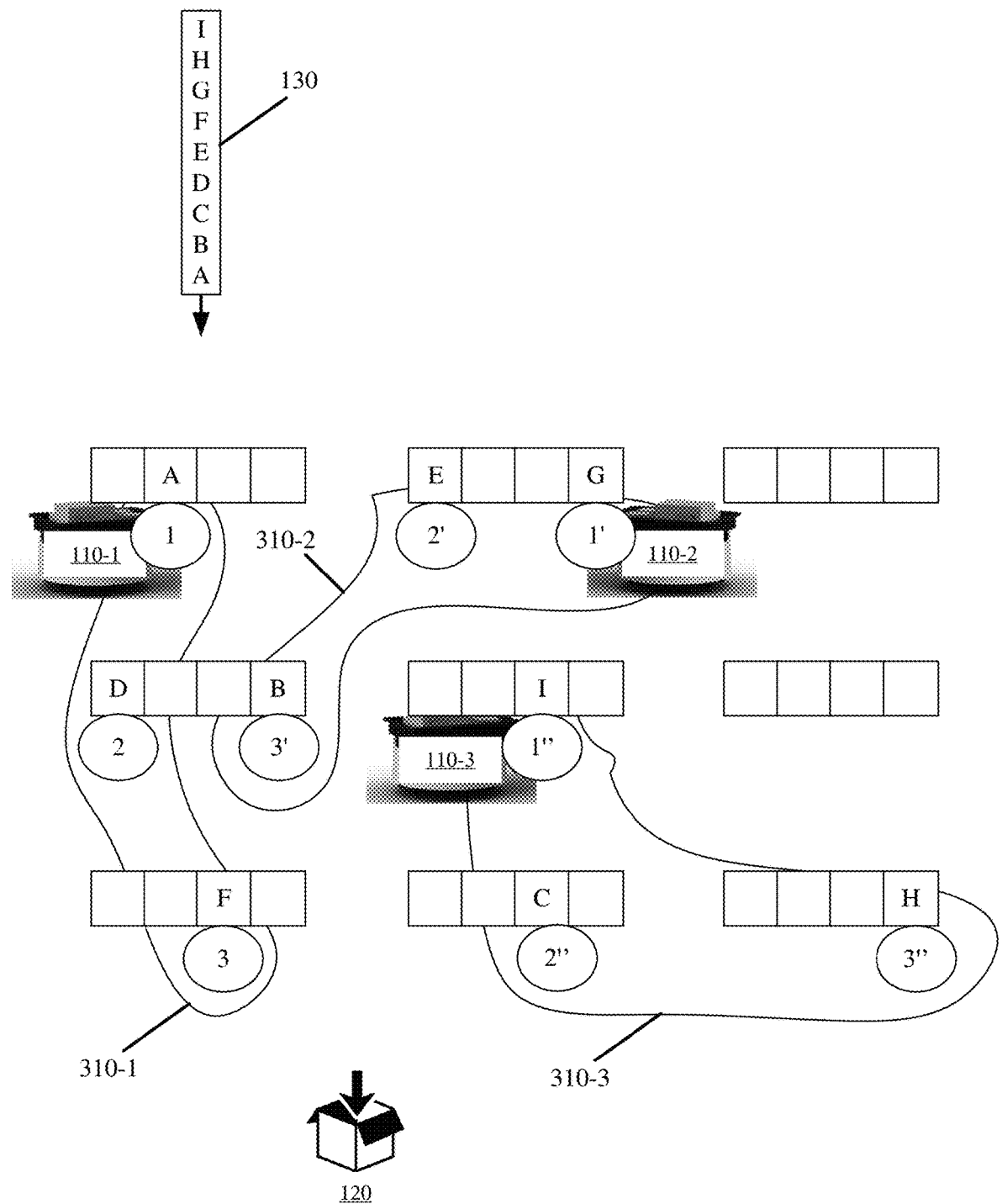
FIG. 3 presents an example of the cluster-based coordinated robot operation in accordance with some embodiments presented herein.

To illustrate the operational efficiencies that result from the cluster-based coordinated operation presented herein, FIG. 1 presents an example of uncoordinated and/or independent robot operation, and FIG. 3 presents an example of cluster-based coordinated robot operation in accordance with some embodiments presented herein.

FIG. 1 illustrates a set of robots 110-1, 110-2, and 110-3 (herein sometimes collectively referred to as "robots 110" or individually as "robot 110") operating in a common environment to retrieve different objects from different source locations, and to deliver the retrieved objects to destination 120. The objects may be stored on shelving, racks, and/or other storage locations distributed across the environment (e.g., a warehouse). The objects may represent individual units of an item. Alternatively, the objects may represent containers, totes, or other receptacles that store one or more units of the same or different items. Robots 110 may identify objects or source locations by scanning or imaging fiducials and/or other identifiers that are associated with the objects and/or source locations using sensors and/or cameras. Destination 120 may include a packaging station or order fulfillment area in which one or more workers combine retrieved objects for a customer order in order to fulfill that customer order.

The uncoordinated operation of robots in FIG. 1 may include receiving object retrieval tasks in sequence 130, and assigning each object retrieval task in sequential order to robots 110-1, 110-2, and 110-3. For instance, retrieval of first item "A" is assigned to robot 110-1, retrieval of second item "B" is assigned to robot 110-2, retrieval of third item "C" is assigned to robot 110-3, retrieval of fourth item "D" is assigned to robot 110-1, and so forth. Reference markers 1, 2, and 3 in FIG. 1 identify retrieval operations performed by robot 110-1 based on the uncoordinated sequential assignment of tasks, reference markers 1', 2', and 3' identify retrieval operations performed by robot 110-2 based on the uncoordinated sequential assignment of tasks, and reference markers 1", 2", and 3" identify retrieval operations performed by robot 110-3 based on the uncoordinated sequential assignment of tasks. Accordingly, robot 110-1 may move to retrieve a first tote containing item "A" from a first source location (e.g., reference marker 1), deliver the first tote to destination 120, return the first tote to the first source location, move to retrieve a second tote containing item "D" from a second source location (e.g., reference marker 2), deliver the second tote to destination 120, return the second tote to the second source location, move to retrieve a third tote containing item "G" from a third source location (e.g., reference marker 3), deliver the third tote to destination 120, and return the third tote to the third source location. Robots 110-2 and 110-3 perform similar tasks for objects that they are assigned to retrieve based on the uncoordinated sequential assignment of tasks.

The sequential assignment of tasks, and the sequential retrieval of objects by robots 110 result in uncoordinated and inefficient operation of robots 110. For instance, the tasks are assigned without accounting for the source locations of different objects (e.g., distance between first and second objects to retrieve). Accordingly, robot 110-1 may be assigned two retrieval tasks (e.g., retrieval of items "A" and "G") that are most distant from destination 120, and that take the longest amount of time to complete. Conversely, robot 110-3 may be assigned two retrieval tasks (e.g., retrieval of items "C" and "F") that are closest to destination 120, and that take the least amount of time to complete. Moreover, assigning the tasks to the robots 110 in the order the tasks are received can also reduce robot efficiency as distance between first and third tasks may be insignificant, but a robot 110 may perform a second task after the first task that takes the robot 110 to an entirely different location that significantly increases the overall distance for completing the three tasks.

As a result of the uncoordinated operation of robots illustrated by FIG. 1, some robots 110 will traverse more distance, complete more overall work, and take longer to finish their tasks than other robots 110. Overall order fulfillment will then take longer because of the unequal distribution of work across robots 110. The uncoordinated operation may also lead to poor resource usage as some robots (e.g., robot 110-1) may deplete their batteries more quickly than others (e.g., robot 110-3) because of the greater distance they must travel, which can further decrease efficiency if the number of robots 110 performing retrieval tasks decreases as a result of one or more robots 110 having to recharge their batteries.

The uncoordinated operation may also result in increased delays when two or more robots 110 attempt to access the same resources at the same time. For instance, two or more of robots 110-1, 110-2, and 110-3 may access path 140 when performing their respective second retrieval task, and may access path 150 when performing their respective third retrieval task. Robots 110 may have to slow operation in order to avoiding colliding with one another, navigate along a longer alternate path to avoid deadlocks, and/or temporarily halt operation and move out of the way of another robot 110 accessing the same path. Each such delay that occurs as a result of the uncoordinated operation further decreases robot efficiency and increases costs as robots 110 need more time and resources to complete the set of tasks.

Figure 2:
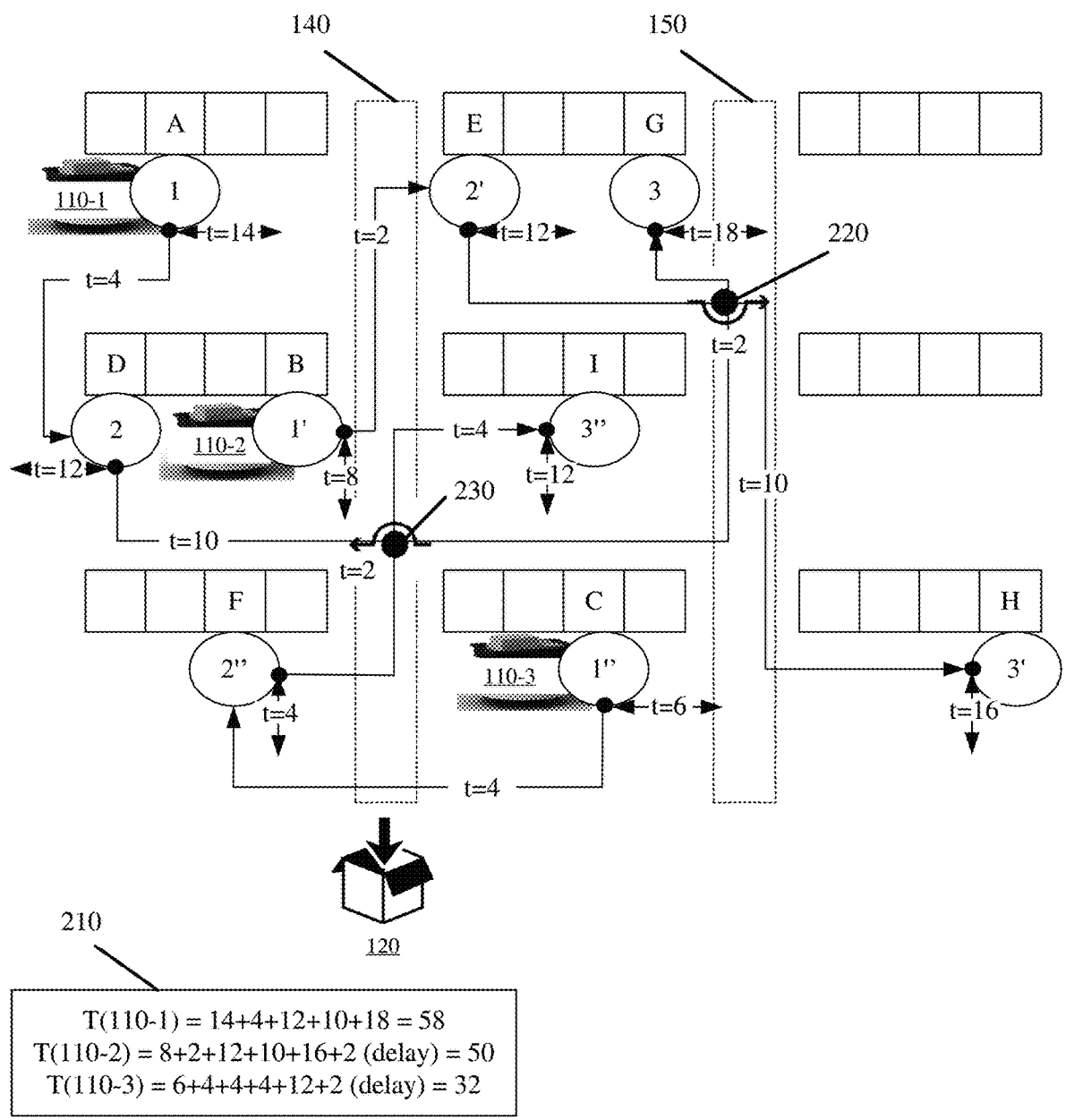
FIG. 2 illustrates an example of the total time for the robots to complete their tasks according to the uncoordinated operation illustrated by FIG. 1.

FIG. 2 illustrates an example of total time 210 for robots 110 to complete their tasks according to the uncoordinated operation illustrated by FIG. 1. In particular, FIG. 2 illustrates an example amount of time for each robot 110 to retrieve, deliver, and return an object from each source location (e.g., the double arrow reference marker at each source location), and an example amount of time for each robot 110 to move between the source locations of the different objects being retrieved by each robot 110 (e.g., the lines connecting the source locations for the different retrieval operations). Total time 210 is derived from the time of each retrieval operation, robots 110 moving to different source locations, and also delays 220 and 230 that robots 110 may experience because of the uncoordinated operation of robots 110, and robots 110 attempting to access the same or similar resources at the same time. Total time 210 of the uncoordinated robot operation reveals a large difference in the amount of work that robots 110 perform. Total time 210 also reveals inefficiencies (e.g., delays 220 and 230) created as a result of the uncoordinated robot operation.

FIG. 3 illustrates faster and improved task execution by robots 110 based on robots 110 operating according to the cluster-based coordinated operation presented herein. In FIG. 3, the set of tasks and/or operations are not assigned to robots 110 in sequential order 130, and/or as the orders are received. Rather, the tasks and/or operations are grouped into clusters 310-1, 310-2, and 310-3 (herein sometimes collectively referred to as "clusters 310" or individually as "cluster 310"). Clusters 310-1, 310-2, and 310-3 are dynamically formed to minimize the total distance robots 110 travel to retrieve requested objects, to equalize the amount of total work performed by each robot 110, and/or to maximize the distance between clusters 310-1, 310-2, and 310-3 so that the difference in time at which different robots 110 access the same or related resource or space is maximized.

Each cluster 310 may be assigned to a different robot 110. Each robot 110 may configure its operations and movements according to an assigned cluster 310. The simultaneous operation of robots 110 is then coordinated based on the assigned clusters 310. For example, cluster 310-1 may be assigned to robot 110-1, cluster 310-2 may be assigned to robot 110-2, and cluster 310-3 may be assigned to robot 110-3. In this example, clusters 310-1, 310-2, and 310-3 may coordinate operations of robots 110-1, 110-2, 110-3 so that robot 110-1 operates within a leftmost portion of the operating environment to retrieve objects associated with requested items "A", "D", and "F" distributed about the leftmost portion, robot 110-2 operates within a central portion of the operating environment to retrieve objects associated with requested items "G", "E", and "B" distributed about the central portion, and robot 110-3 operates within a rightmost portion of the operating environment to retrieve objects associated with requested items "I", "C", and "H" distributed about the rightmost portion. Moreover, the order of object retrieval for each cluster 310 is optimized so that the objects associated with a cluster 310 are retrieved with the lowest total distance and/or least amount of time.

Clusters 310 illustrated in FIG. 3 may be formed to equalize the amount of work performed by each robot 110. In some embodiments, the amount of work associated with each cluster 310 is equalized by forming clusters 310 to involve traversal of an about equal amount of distance. Other factors can also be accounted for in determining the amount of work that is required to complete each cluster. For instance, clusters 310 may account for differences in speed at which different robots 110 operate, different speed limits along different paths associated with each cluster 310, expected congestion, time to retrieve an object, etc.

Clusters 310 illustrated in FIG. 3 may also be formed to maximize the distance between clusters 310, while still minimizing the total distance required to complete tasks of each cluster 310 as well as all tasks of all clusters 310. The distance between clusters 310 may be maximized by minimizing the same points in space and/or same resources that are accessed by two or more robots completing tasks of two or more clusters 310.

In some cases, shared access may be unavoidable. For instance, several objects may be concentrated in one area of a warehouse, or retrieved objects may be delivered to the same destination 120. The cluster formation may still maximize distance between clusters 310 that require access to overlapping resources by maximizing the time between different robots 110 accessing the same space or resource. Accordingly, even though the cluster-based coordinated operation may control first robot 110-1 and second robot 110-2 in accessing the same path, shelf, or resource, clusters 310 may be formed such that first robot 110-1 accesses the path, shelf, or resource at a first time, and second robot 110-2 accesses the same path, shelf, or resource at a second time that is sufficiently distant from the first time that the likelihood of conflicted access is minimized or eliminated.

Figure 4:
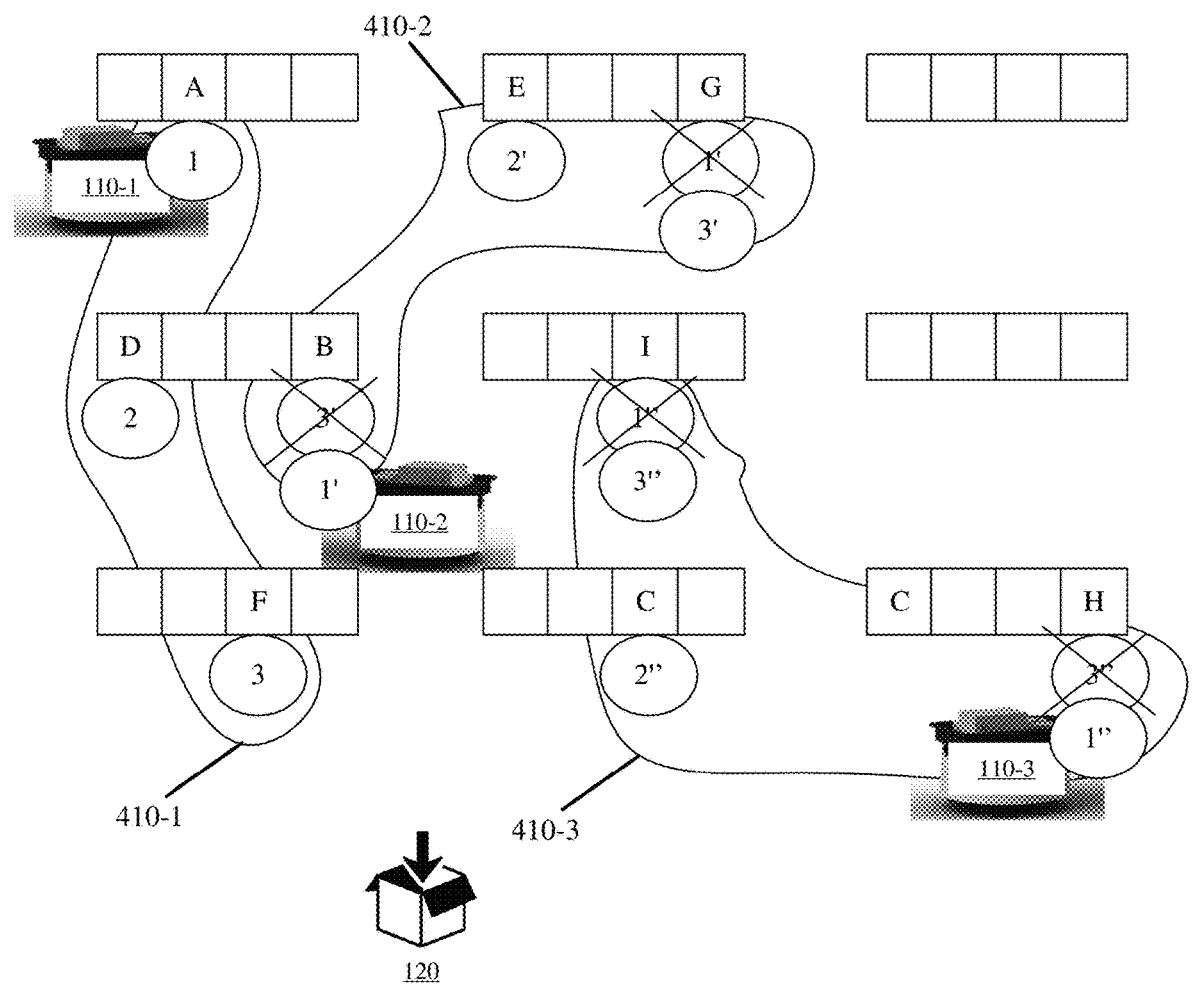
FIG. 4 illustrates an example of the cluster-based coordinated operation of robots that minimizes total completion time, equalizes work across the robots, and maximizes distance the distance between clusters by maximizing physical distance between resources accessed as part of each cluster and also maximizing differences in access times in accordance with some embodiments presented herein.

FIG. 4 illustrates an example of cluster-based coordinated operation of robots 110 that minimizes total completion time, equalizes work across robots 110, and maximizes distance between clusters 310 by maximizing physical distance between resources accessed as part of each cluster and also maximizing differences in access times. FIG. 4 illustrates cluster-based coordinated operation of robots with clusters 410-1, 410-2, and 410-3 (herein sometimes collectively referred to as "clusters 410" or individually as "cluster 410") that include retrieval of the same objects as clusters 310-1, 310-2, and 310-3. However, the order of object retrieval for clusters 410-2 and 410-3 differ from the order of object retrieval specified for clusters 310-2 and 310-3 so as to minimize potential points of intersection between robots 110 by maximizing the time between robots 110 accessing the same or nearby points in space or other resources.

As shown in FIG. 4, cluster 410-1 may coordinate and control operations of robot 110-1 to commence from the top left of the environment, cluster 410-2 may coordinate and control operations of robot 110-2 to commence from about centrally within the environment, and cluster 410-3 may coordinate and control operations of robot 110-3 to commence from the bottom right of the environment. Accordingly, the first retrieval performed by each robot 110 occurs at a different tier, section, or path within the environment such that the difference in time between robots 110 arriving at destination 120 with a first object is maximized. In other words, clusters 410-1, 410-2, and 410-3 may cause robots 110-1, 110-2, and 110-3 to arrive at destination 120 in a staggered or non-overlapping manner.

Clusters 410 may also maximize the time between retrievals of other objects. For instance, clusters 410 coordinate and cause robots 110 to also retrieve second and third objects from different tiers, sections, or paths of the environment. As a result of the coordinated robot operation based on clusters 410, there are fewer potential points of intersection. Robots 110 may therefore complete their tasks with fewer delays. It should be noted that maximizing the differences in access times does not increase or otherwise impact the total distance traversed by each robot 110 or the total work performed by each robot 110, but rather allows robots 110 to operate at higher speed with less obstacle avoidance.

Figure 5:
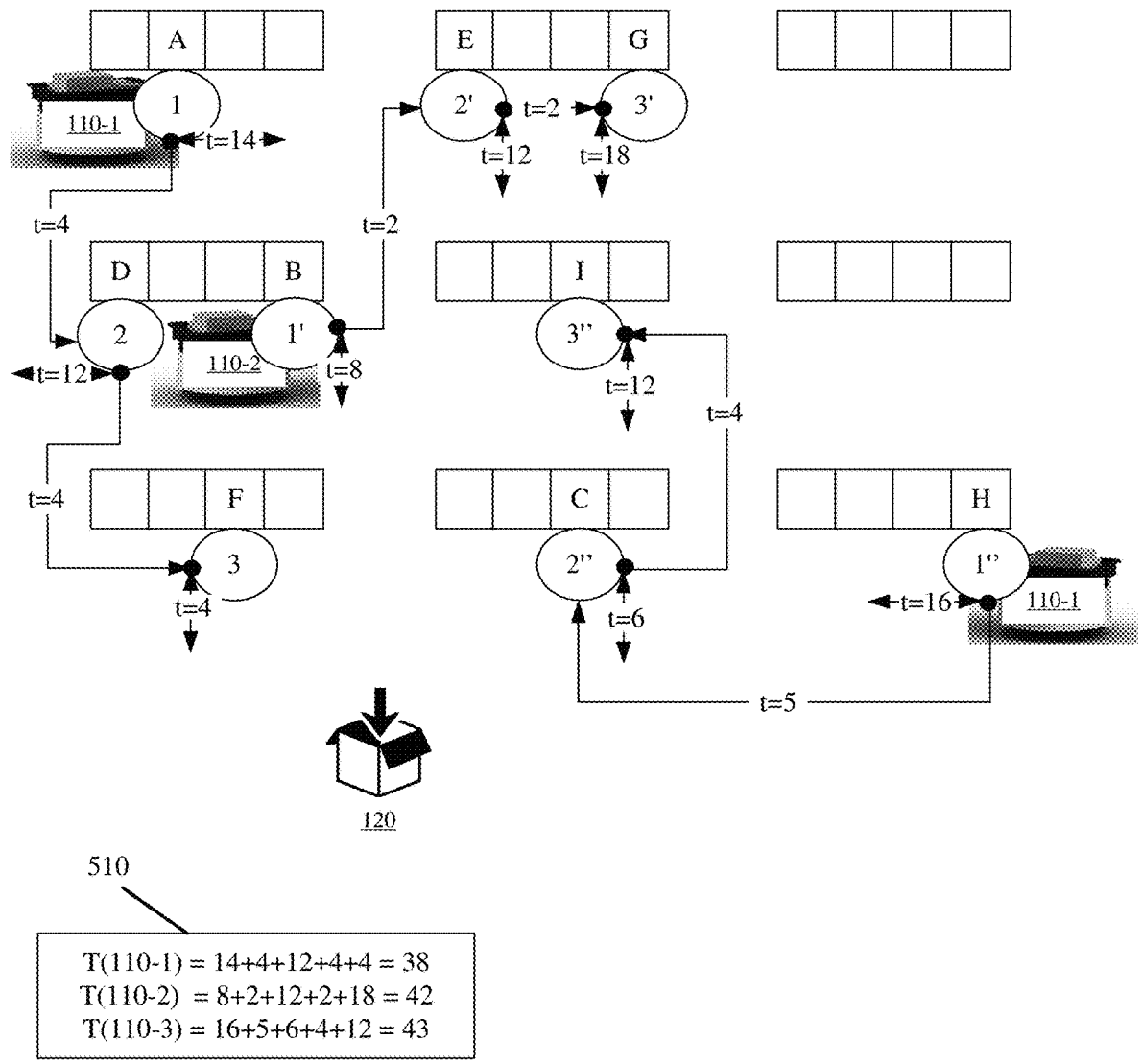
FIG. 5 illustrates an example of the total time for the robots to complete their tasks according to the coordinated operation of robots based on the clusters of FIG. 4 in accordance with some embodiments described herein.

FIG. 5 illustrates an example of total time 510 for robots 110 to complete their tasks according to the coordinated operation of robots 110 based on clusters 410 of FIG. 4 in accordance with some embodiments described herein. Total time 510 is derived from the time of each retrieval operation, and robots 110 moving to different source locations. The coordinated operation of robots 110 based on clusters 410 eliminates delays associated with two or more robots 110 attempting to access the same or similar resources at the same time. Comparing total time 510 from the cluster-based coordinated operation of robots 110 against total time 210 from the uncoordinated operation of robots 110 (see FIG. 2) demonstrates how the cluster-based coordinated operation of robots 110 is more efficient. In particular, the same set of robots 110 are able to complete the same tasks in less time with fewer resources and fewer conflicts. Moreover, robots 110 complete all tasks at or near the same time because of the minimized and equalized distance that each robot 110 traverses in order to complete the tasks associated with an assigned cluster. Thus, directing and controlling the robots via clusters 410 lowers operational costs as robots 110 are able to complete more tasks in the same amount of time with fewer resources than operating robots 110 in the uncoordinated manner illustrated in FIGS. 1 and 2 above.

The cluster-based coordinated robot operation seeks to minimize the distance and/or time for robots 110 to complete tasks associated with an assigned cluster, and also the total distance and/or time for robots 110 to complete all pending tasks. Accordingly, in some embodiments, the cluster formation may produce clusters of unequal size in order to equalize the amount of work that is assigned to each robot 110. For instance, different clusters assigned to different robots 110 may include more or less objects to retrieve or different numbers of tasks to complete, with the collective set of clusters coordinating robots 110 in an optimal matter that minimizes and equalizes total distance traveled by each robot 110 and all robots 110, and also maximizes distance between clusters and all tasks performed by robots 110.

Figure 6:
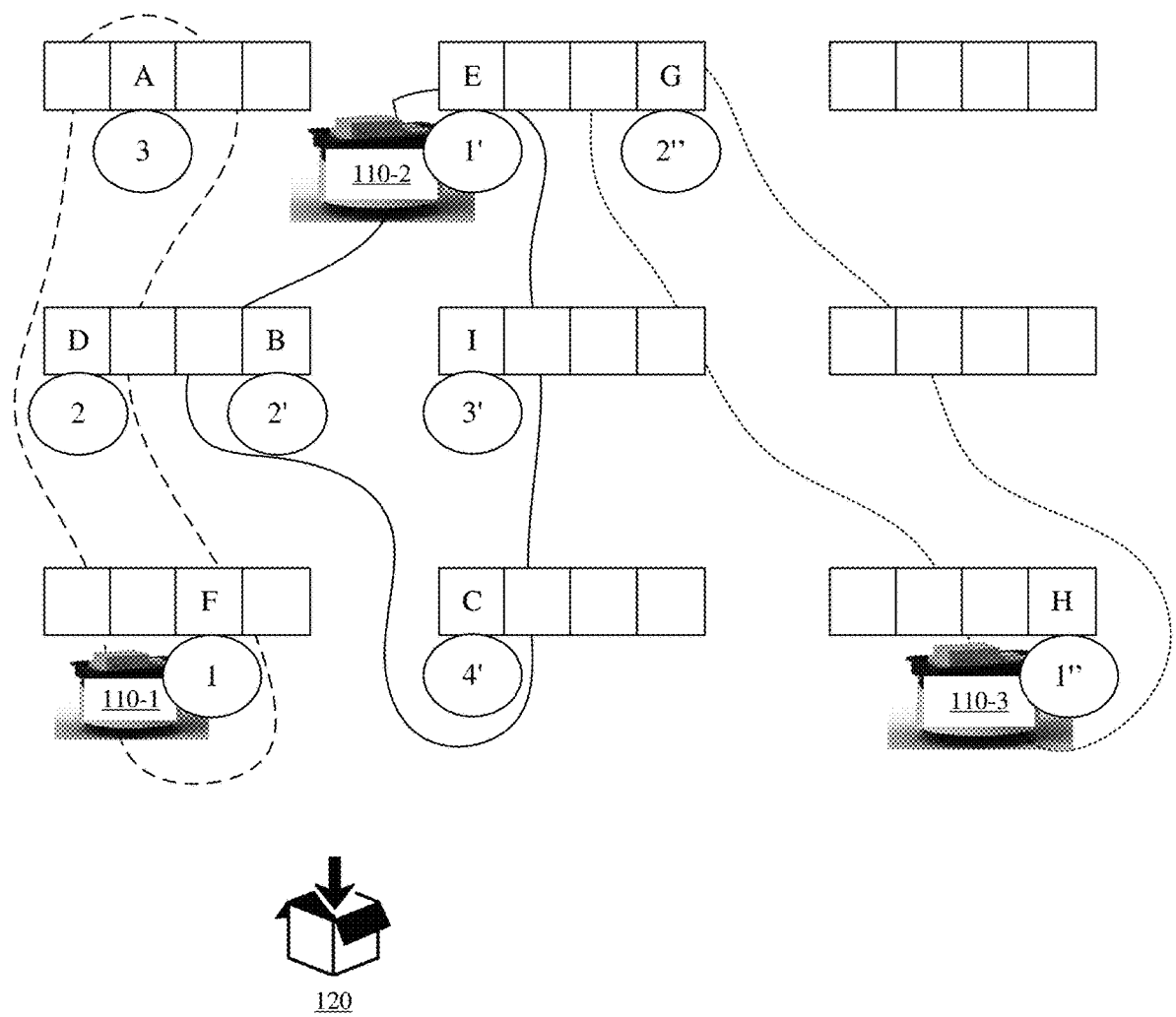
FIG. 6 illustrates an example of the cluster-based coordinated operation of robots using clusters of different sizes in accordance with some embodiments presented herein.

FIG. 6 illustrates an example of cluster-based coordinated operation of robots 110 using clusters of different sizes in accordance with some embodiments presented herein. In this figure, the objects that are to be retrieved have a different distribution within the common environment than the previous figures. The different distribution presented in FIG. 6 leads to the formation and use of unequal clusters 610-1, 610-2, and 610-3 (herein sometimes collectively referred to as "clusters 610" or individually as "cluster 610") to coordinate and control robot 110 operation. For instance, clusters 610 may be formed to include a different number of tasks. Although each cluster 610 includes a different number of tasks, the total distance and/or time to complete the tasks of each cluster 610 is relatively similar such that robots 110 perform a similar amount of work irrespective of which cluster 610-1, 610-2, or 610-3 they are assigned. In some embodiments, the amount of work performed by each robot 110 may be derived from the total distance that is traversed by that robot 110, the amount of time it takes for robot 110 to complete the assigned tasks based on performance characteristics of robot 110, and/or resources that robot 110 consumes (e.g., battery usage, actuator movements, etc.) in performing the tasks.

Figure 7:
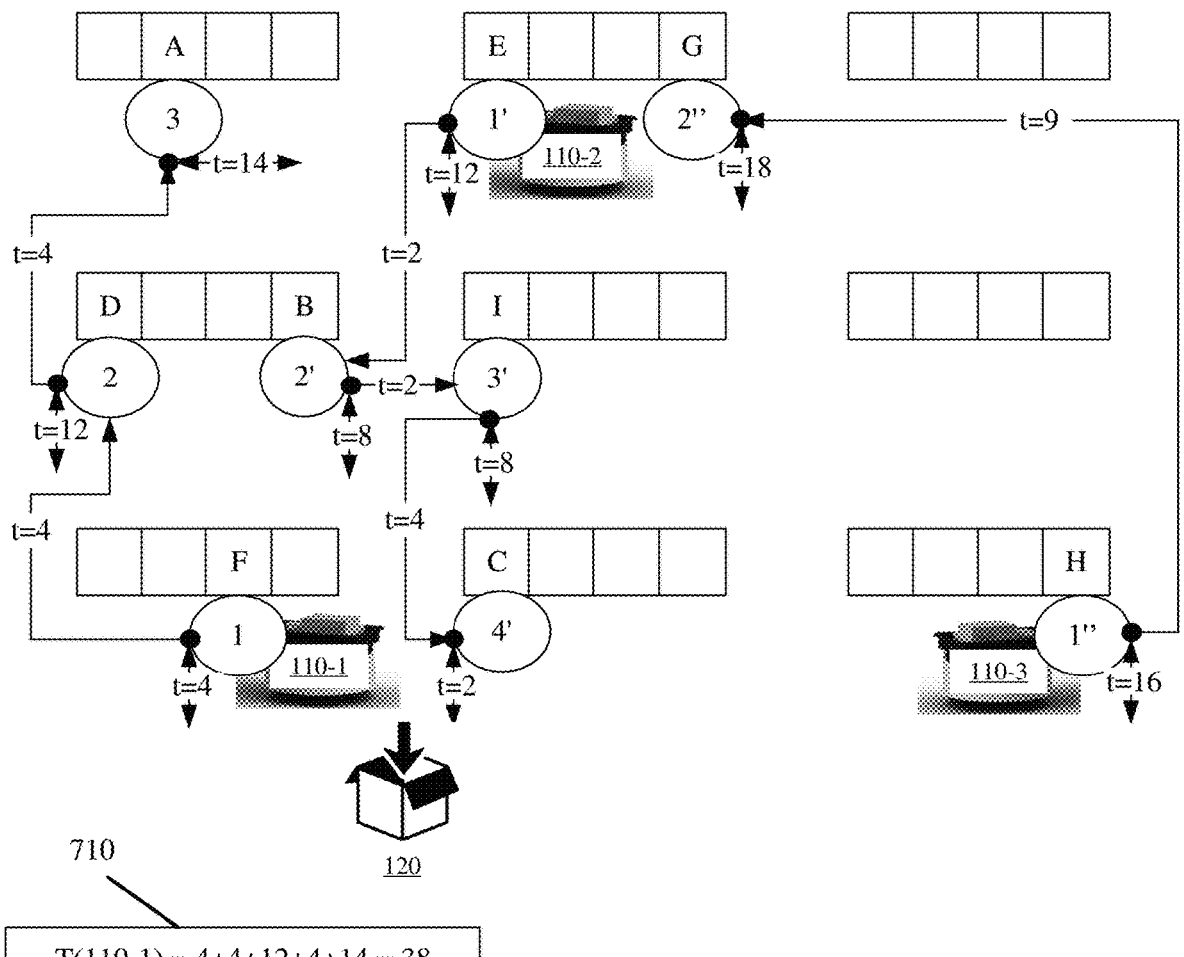
FIG. 7 illustrates an example of the total time for the robots to complete their tasks according to the coordinated operation of robots based on the unequal clusters of FIG. 6.

FIG. 7 illustrates an example of total time 710 for robots 110 to complete their tasks according to the coordinated operation of robots 110 based on unequal clusters 610 of FIG. 6. As shown from total 710, even though robot 110-1 performs three retrieval operations, robot 110-2 performs four retrieval operations, and robot 110-3 performs two retrieval operations, total time 710 and/or total work for each robot to perform all retrieval operations associated with clusters 610-1, 610-2, and 610-3 respectively is about equal (e.g., 38, 38, and 43). The equal completion time may be due to the cluster formation generating clusters 610 so that sum of the time to traverse the total distance of each cluster with the time for a robot 110 to perform the retrieval operations and/or other tasks associated with each cluster 610 is about equal. Accordingly, clusters 610 coordinate robots 110 in an optimal manner in which the total work performed by robots 110 to complete the retrieval operations and/or tasks of clusters 610 is minimized and equalized, while the difference in time at which different robots 110 access the same or related resources or spaces are maximized even though clusters 610 coordinate and/or control each of robots 110-1, 110-2, and 110-3 in performing a different number of retrieval operations and/or tasks.

Figure 8:
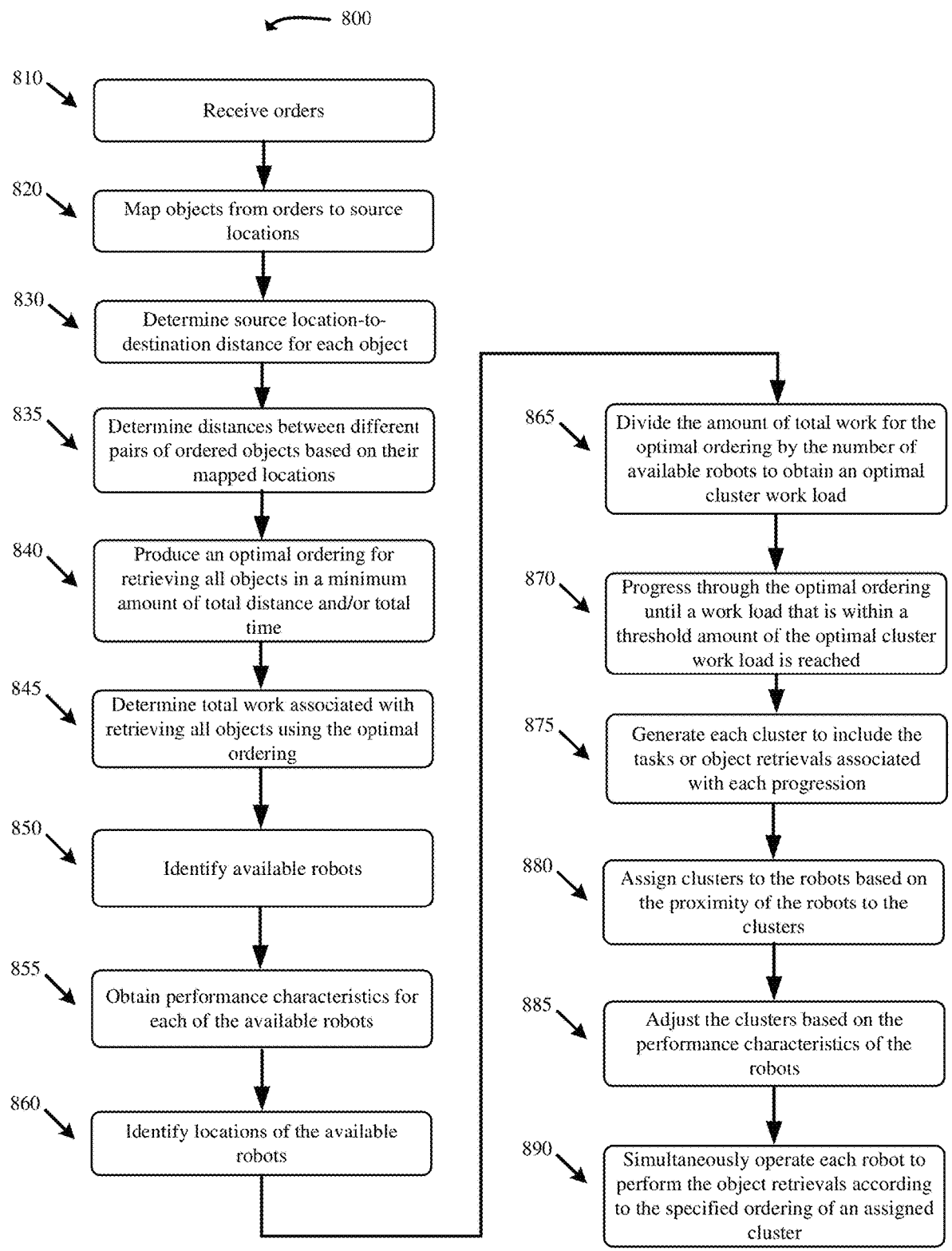
FIG. 8 presents a process for dynamically generating clusters to coordinate and control robot operation in accordance with some embodiments.

FIG. 8 presents process 800 for dynamically generating clusters to coordinate and control robot operation in accordance with some embodiments. Process 800 may be performed by a centralized planner that is responsible for directing each of two or more autonomous robots 110 operating within a common environment. In some embodiments, the centralized planner may coordinate and control operations of robots 110 by generating and assigning the clusters to robots 110. The centralized planner may include one or more systems or devices that are communicatively coupled to robots 110. For instance, the centralized planner may use wireless network connectivity to assign different clusters to different robots 110, and thereby coordinate or direct operation of those robots 110. The centralized planner may also be connected, via wired or wireless networking, to other systems associated with the operating environment. For instance, the centralized planner may be coupled to a warehouse or inventory management system that receives orders for different objects from different customers or devices. In some other embodiments, process 800 may be a distributed process that is performed by one or more of robots 110.

Process 800 may include receiving (at 810) one or more orders. Each received order may correspond to a task that a robot is to complete. For instance, each received order may correspond to an object retrieval task. An object may include an individual unit of an item, or a tote that contains multiple units of the same item or different items. The orders may be received at an order fulfillment system over a network via a website, database, points of sale terminals, other systems, and/or other devices.

Process 800 may include mapping (at 820) the ordered objects to different source locations within the environment. The source locations correspond to the locations where the objects are stored. For instance, when an object is stored on a particular shelf within the environment, one or more identifiers associated with the object's location and/or the particular shelf may be scanned and uploaded to the order fulfillment system that tracks inventory and object placement. In this manner, the order fulfillment system may track the source locations for different objects, and may map (at 820) ordered objects to the different source locations.

Process 800 may include determining (at 830) the source location-to-destination distance for each ordered object. For instance, each of the ordered objects may be delivered to the same destination (e.g., an order fulfillment station) where the ordered objects are grouped together to fulfill the customer order. In determining (at 830) the source location-to-destination distance, process 800 determines one or more available paths for delivering each object from its source location to the destination, and the distance of each path. In some embodiments, process 800 may select the shortest source location-to-destination path from a set of available paths. In some embodiments, process 800 may select the fastest source location-to-destination path based on congestion, number of turns, distance, speed limits, and other factors impacting the speed with which a robot can traverse the path.

Process 800 may also include determining (at 835) distances between different pairs of ordered objects based on their mapped locations. In some embodiments, process 800 may determine 835 the distance between one object and two or more nearest objects.

Using the source location-to-destination distance and/or distances between pairs of ordered objects, process 800 may include producing (at 840) an optimal ordering for retrieving all objects and/or completing all tasks in the least amount of time and/or least amount of total traversed distance. In some embodiments, producing (at 840) the optimal ordering may include solving a traveling salesman problem to identify the shortest possible route for retrieving each of the ordered objects. For instance, process 800 may select each object from the received order set as an initial starting point, may compute the shortest route through all objects from each starting point, and may determine the starting point and route that provides the most efficient traversal.

Process 800 may include determining (at 845) the total work associated with retrieving all objects using the optimal ordering. In some embodiments, the total work may be computed based on the source location-to-destination distance and/or time for retrieving each object, and also the distance and/or time between objects in the optimal ordering. The time may be based on average performance characteristics of robots 110 operating in the environment. For instance, the time may be computed based on how fast robots 110, on average, may move within the environment (e.g., traverse the source location-to-destination distance and/or distance between object source locations), may retrieve an object from a source location, and/or may deposit the retrieved object at the destination. Time associated with robots 110 performing other operations may also be included in determining (at 845) the total work. For instance, timing for performing turns, reduced speed in certain areas, and/or accelerating may also be accounted for.

In some embodiments, the clusters may be formed by partitioning the optimal ordering into equal amounts of work for robots 110 to complete. To do so, process 800 may include identifying (at 850) available robots 110, obtaining (at 855) performance characteristics for each available robot 110, and identifying (at 860) the location of each available robot 110.

The performance characteristics may be stored in memory and/or a database, and identified for each robot 110 based on a unique identifier (e.g., serial number, model number, and/or other value) associated with each robot 110. The performance characteristics account for speed, acceleration, time-to-turn, time-to-retrieve, and/or other robotic operations performed by robots 110. For instance, one set of robots may be able to operate (e.g., move, retrieve, etc.) faster than another set of robots, one set of robots may be adapted to retrieve heavy and/or large objects and another set of robots may be adapted to retrieve light and/or small objects, and/or one set of robots may have functionality that another set of robots does not. Accordingly, different robots 110 may have different performance characteristics based on different actuators and functionalities of different robots 110, charge or power levels, size, and/or other physical and operational differences between robots 110.

The location of each robot 110 may be a current location of each robot 110, or a location at which each robot 110 is to complete a current task. For instance, robot 110 may return an object to a source location. The location of that robot 110 may be the source location for the returned object. The location of robots 110 may be obtained via wireless communications with robots 110, and/or tracking operations or clusters that are assigned to robots 110, the current operation being performed by each robot 110, and the end location associated with the current operation.

Cluster generation may include dividing (at 865) the determined (at 845) amount of total work for the optimal ordering by the identified (at 850) number of available robots. The result may be an optimal cluster work load. Cluster generation may further include progressing (at 870) through the optimal ordering (e.g., some number of tasks or object retrievals) until a work load that is within a threshold amount of the optimal cluster work load is reached, and generating (at 875) each cluster to include the tasks or object retrievals associated with each progression.

Process 800 may include assigning (at 880) the generated clusters to robots 110 based on proximity of robots 110 (e.g., identified location of robots 110) to the clusters. Process 800 may then include adjusting (at 885) the clusters based on the obtained (at 855) performance characteristics of robots 110. For instance, process 800 may simulate or compute the time for each robot 110 to complete its assigned cluster based on the robot's performance characteristics. If the expected completion time for two or more cluster deviates by a threshold amount, adjusting (at 885) the clusters may include shifting one or more tasks or object retrievals from a cluster of a slow-performing robot to an adjacent cluster of a fast-performing robot. Multiple adjustments may be made to balance the work performed by each robot and/or cluster completion times.

In this manner, process 800 may produce clusters (i) that minimize the total distance traversed by each robot 110, and/or the collective set of robots 110, in fulfilling the received (at 810) orders, (ii) that equalize the amount of work performed by all robots 110 based on performance characteristics of each individual robot so that cluster completion times do not vastly differ, and (iii) that minimize points of intersection for two or more robots 110 at the same or similar points in time by localizing operations of robots 110 to different areas or collocated tasks. Process 800 may include simultaneously operating (at 890) each robot 110 to perform the object retrievals according to the specified ordering of an assigned cluster.

In some embodiments, the cluster assignments may be reassigned dynamically as the robots begin operation. For instance, a first robot may be assigned a first cluster and a second robot may be assigned a second cluster. The first and second robots may use the same path in order to arrive at the starting point of each cluster, and the first cluster may be closer than the second cluster. Therefore, if the first robot assigned to the first cluster moves before the second robot, and blocks a path of the second robot to the second cluster, the cluster may be dynamically reassigned so that the first robot continues to second cluster while the second robot is reassigned to perform operations associated with the first cluster. The dynamic cluster reassignment is provided for efficiency reasons, and to ensure that the robots complete all tasks in the shortest total amount of time.

Figure 9A:
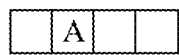
FIGS. 9A, 9B, 9C, and 9D illustrate an example of cluster formation in accordance with some embodiments presented herein.
Figure 9A:
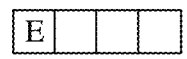
Figure 9A:
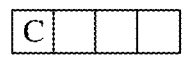
Figure 9A:
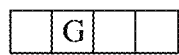
Figure 9A:
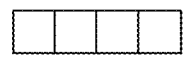
Figure 9A:
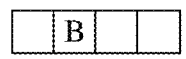
Figure 9A:
Figure 9A:
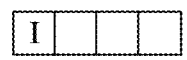
Figure 9A:
Figure 9A:
Figure 9B:
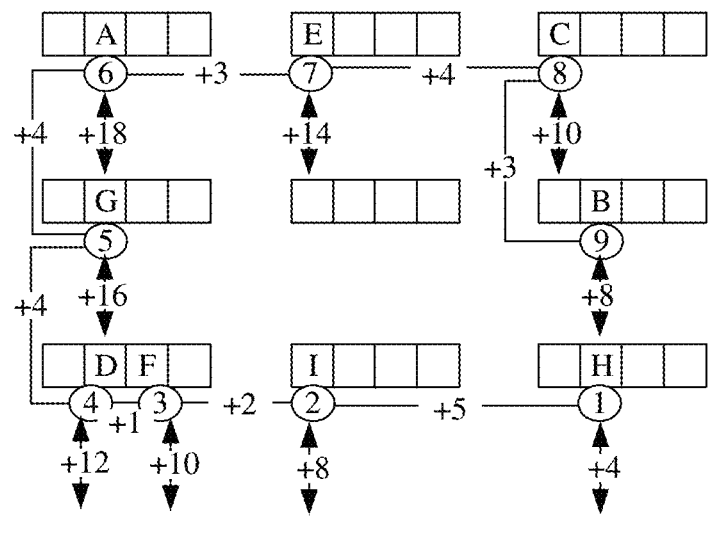
Figure 9B:
Figure 9C:
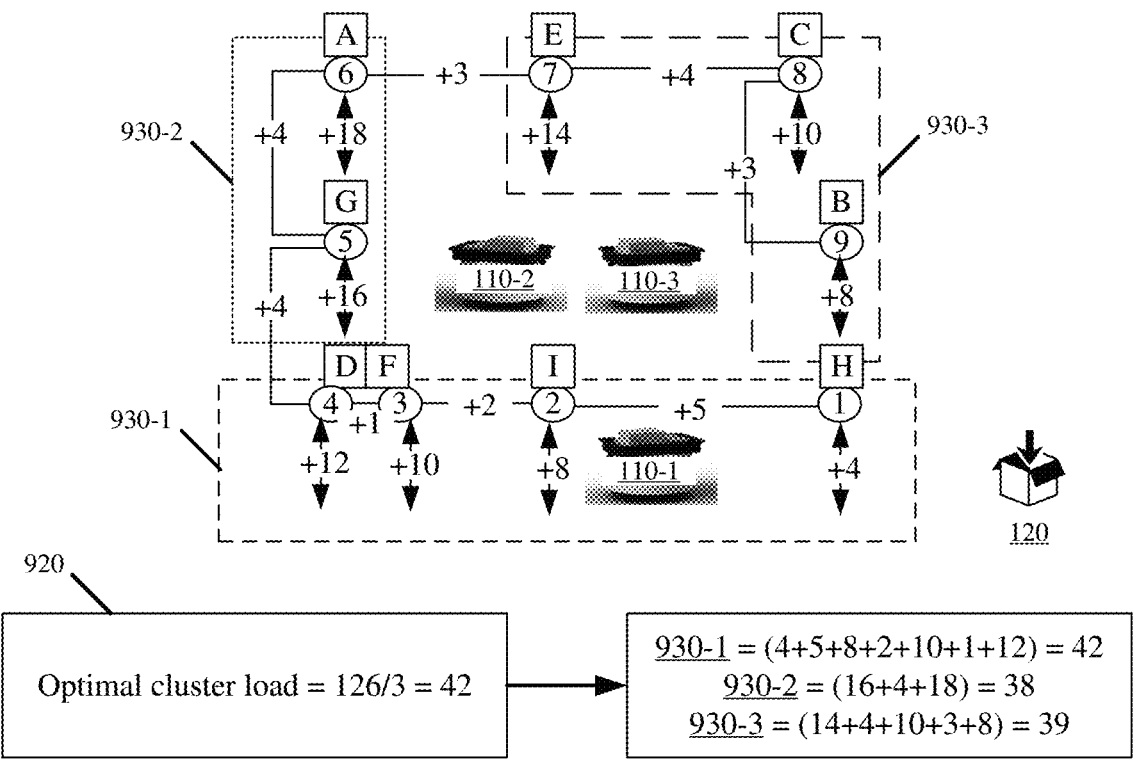
Figure 9D:
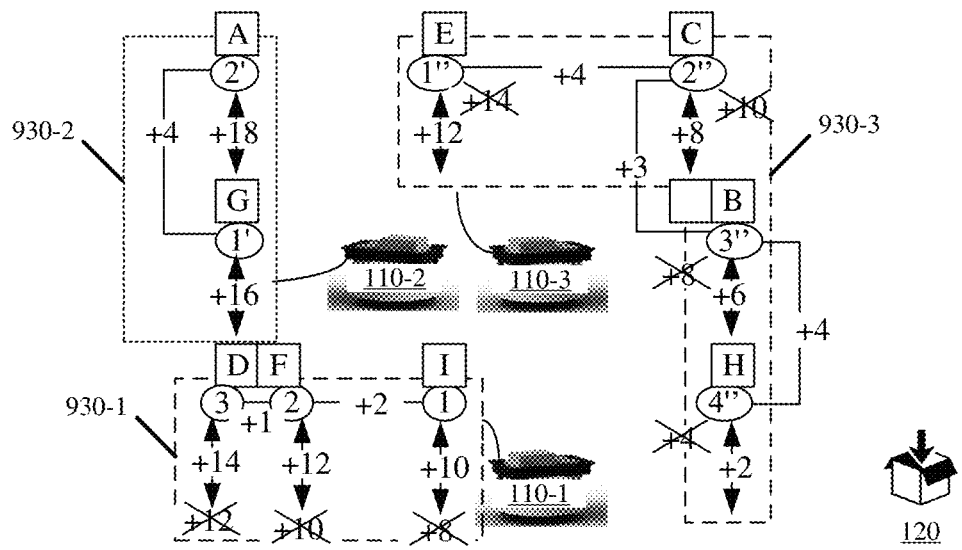

FIGS. 9A, 9B, 9C, and 9D illustrate an example of cluster formation in accordance with some embodiments presented herein. FIG. 9A illustrates initially mapping locations of ordered objects that are to be retrieved and delivered to destination 120. FIG. 9B illustrates determining an optimal order for retrieving the ordered objects (e.g., reference markers 1-9), and determining total work 910 associated with retrieving the objects according to the optimal order. FIG. 9C illustrates identifying availability and locations of three robots 110-1, 110-2, and 110-3, determining optimal cluster work load 920 by dividing the total work 910 by the number of available robots (e.g., 3), and generating clusters 930-1, 930-2, and 930-3 by progressing through the optimal ordering, and by partitioning the optimal ordering into sets of tasks with workloads about equal to optimal cluster work load 920. FIG. 9D illustrates assigning cluster 930-1 to robot 110-1, cluster 930-2 to robot 110-2, cluster 930-3 to robot 110-3, adjusting completion time for each cluster 930 based on performance characteristics of an assigned robot 110, and modifying clusters 930-1 and clusters 930-3 to more equally distribute load based on slower performing robot 110-1 and faster performing robot 110-3.

In the above embodiments, the clusters are formed to coordinate and control robot operation in retrieving an object or tote from a source location, delivering the object or tote to a destination, and returning the object or tote from the destination to the source location before moving to, retrieving, delivering, and returning a different object or tote from a different source location. In some embodiments, process 800 may be adapted to coordinate and control robots 110 in performing related or different operations. For instance, the cluster generation may be adapted to accommodate operations in which a robot 110 retrieves a first object from a first source location, delivers the first object to a destination, and then moves to retrieve a second object from a second source location rather than return the first object to the first source location. In this instance, the cluster generation does not account for the distance to return an object from the distance to the source location, and does account for the distance for retrieving different objects from the destination as opposed to the source location of a returned object. As another example, the cluster generation may be adapted to accommodate operations in which a robot 110 retrieves a first object from a first source location, delivers the first object to a destination, transfers the first object to a second source location of a second object, and swaps the first object with second object (e.g., retrieves the second object from the second source location, and places the first object at the second source location).

In some embodiments, process 800 may be adapted for operations other than object retrieval. For instance, clusters may be generated for an optimal restocking of inventory (e.g., placing objects from a shipment to different source locations), mapping of a site (e.g., deploying different robots to map different sections of a site), assembling of products (e.g., different robots performing different operations for piecing together an object), and/or other tasks that involve the coordinated operations of two or more robots.

In some embodiments, the cluster generation and/or process 800 may be dynamically performed to account for ever-changing conditions of the operating environment. For instance, clusters may be regenerated at recurring intervals (e.g., every second) to ensure that the clusters account for the current state of the robots as well as new operations that the robots are to perform. Additionally, or alternatively, the clusters may be regenerated when there is a detected change to one or more monitored conditions.

Detecting a change to a monitored condition can include monitoring an order or operation queue for any newly received orders or operations for the robots to perform and/or cancellation or changes to any order or operation that is already in the queue. For instance, cluster generation and/or process 800 may be dynamically performed upon receipt of each new order. Detecting a changing to a monitored condition can also include monitoring status and/or operation of the robots for failures, unexpected delays, and/or operation complete by the robots. For instance, cluster generation and/or process 800 may be dynamically performed when a particular robot experiences a failure, and other robots are reassigned to perform the operations associated with the cluster that was previously assigned to the particular robot.

A set of regenerated clusters may be compared against a previous set of clusters to determine if the set of regenerated clusters is more efficient. If so, operation of robots 110 based on the previous of clusters may be interrupted, and each robot 110 may be directed to resume operations according to the set of regenerated clusters. In some embodiments, robots 110 may be allowed to complete a current operation or tasks before continuing operations based on a set of regenerated clusters.

Figure 10:
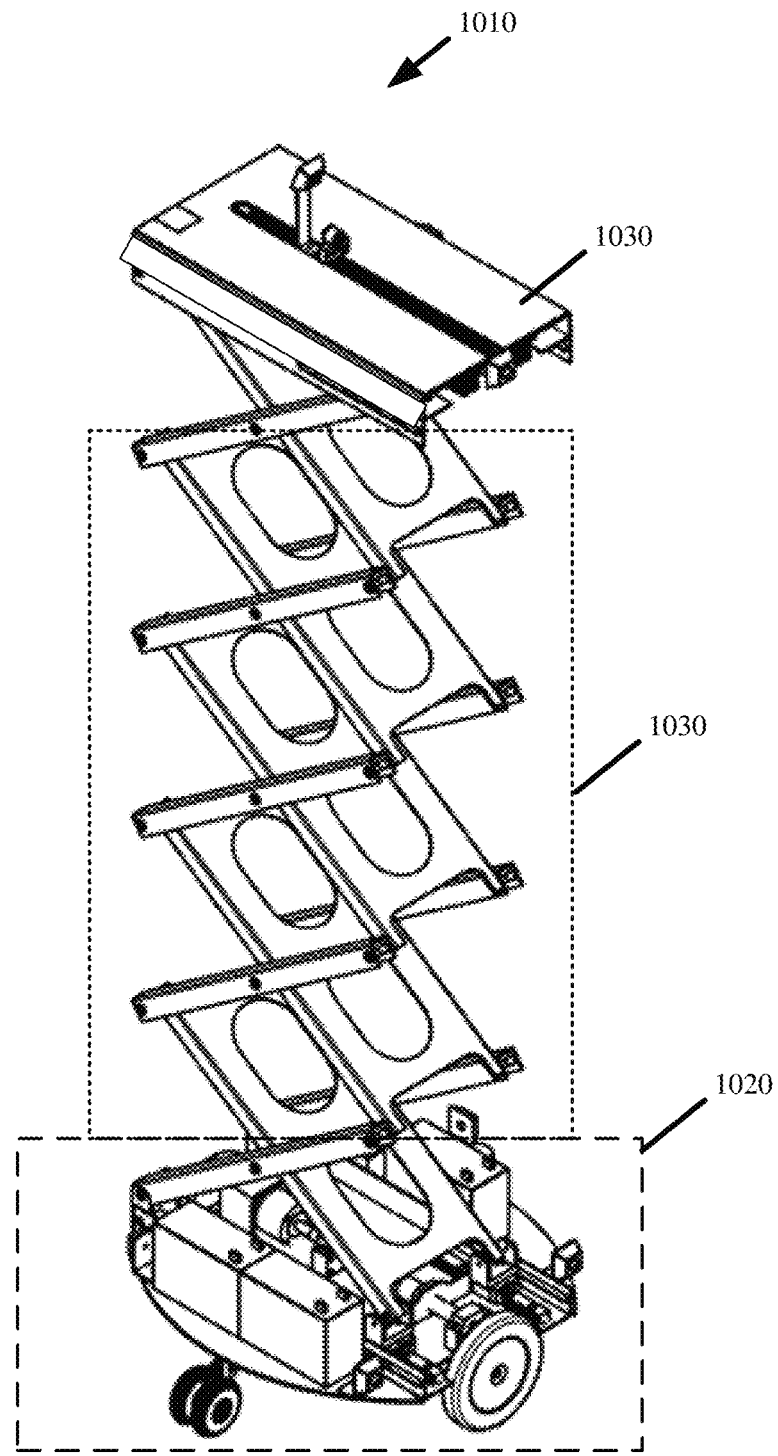
FIG. 10 illustrates an example of a robot whose operations may be coordinated and controlled using the clusters presented herein.

FIG. 10 illustrates an example of a robot whose operations may be coordinated and controlled using the clusters presented herein. Robot 1010 may include a motorized base 1020 on which one or more motors, batteries, processors, wireless radios, sensors, and wheels are mounted. Motorized base 1020 powers locomotion or movement of robot 1010 in three-dimensional space. In some embodiments, motorized base 1020 may include articulating legs, propellers, tracks, or other means of locomotion besides the illustrated wheels.

Atop motorized base 1020 is lift 1030 that raises and lowers platform 1040. As shown, lift 1030 may include a collapsing and expanding structure. In some embodiments, lift 1030 may include a pneumatic piston or other means for raising and lowering platform 1040.

Platform 1040 may include an elongated surface onto which containers and other objects retrieved by robot 1010 may be retained during transport. Platform 1040 may also include a mechanical retriever for retrieving containers and/or other objects onto platform 1040. The mechanical retriever may include at least one motor for moving a retrieval element. The retrieval element may include a vacuum that uses suction to engage containers and/or other objects. The retrieval element may alternatively include a gripper, articulating mechanical arm, or other means to grab or otherwise engage containers and/or objects.

Robot 1010 may use one or more onboard processor to execute operations associated with an assigned cluster. For instance, the processor may activate and control, based on an assigned cluster, one or more actuators of robot 1010 to navigate to a first object source location, retrieve the first object, and deliver the first object to a destination. The processor may also be used for cluster generation when the cluster generation is performed independent of a central planner.

Robot 1010 is presented as one example of an autonomous robot that may coordinate its operations with other robots based on the systems and/or methods for cluster generation and coordinated robot operation set forth herein. Other robot embodiments and the operations performed by the other robot embodiments may similarly be coordinated and controlled for object retrieval tasks and/or other tasks using the clusters and the cluster generation system and methodologies set forth herein.

Figure 11:
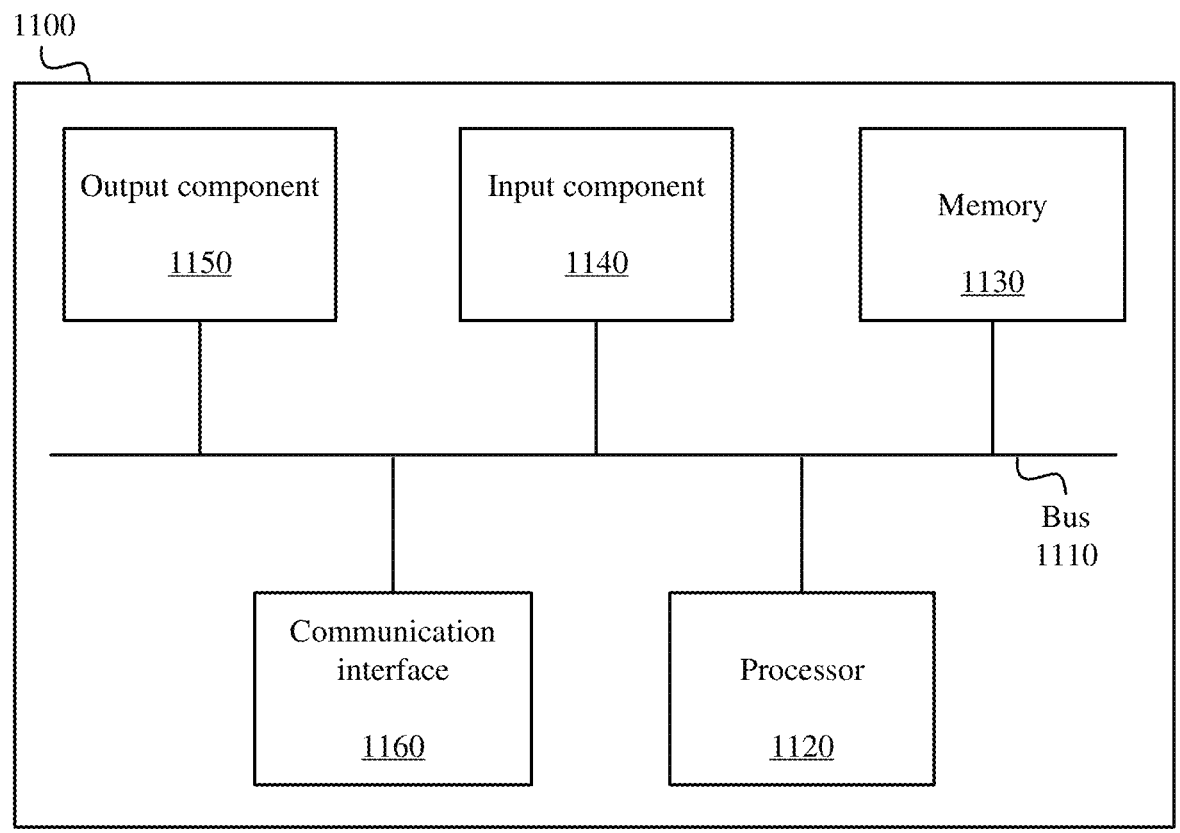
FIG. 11 illustrates example components of one or more devices, according to one or more embodiments described herein.

FIG. 11 is a diagram of example components of device 1100. Device 1100 may be used to implement certain of the devices described above (e.g., order fulfillment system, cluster generation system, etc.). Device 1100 may include bus 1110, processor 1120, memory 1130, input component 1140, output component 1150, and communication interface 1160. In another implementation, device 1100 may include additional, fewer, different, or differently arranged components.

Bus 1110 may include one or more communication paths that permit communication among the components of device 1100. Processor 1120 may include a processor, microprocessor, or processing logic that may interpret and execute instructions. Memory 1130 may include any type of dynamic storage device that may store information and instructions for execution by processor 1120, and/or any type of non-volatile storage device that may store information for use by processor 1120.

Input component 1140 may include a mechanism that permits an operator to input information to device 1100, such as a keyboard, a keypad, a button, a switch, etc. Output component 1150 may include a mechanism that outputs information to the operator, such as a display, a speaker, one or more light emitting diodes ("LEDs"), etc.

Communication interface 1160 may include any transceiver-like mechanism that enables device 1100 to communicate with other devices and/or systems. For example, communication interface 1160 may include an Ethernet interface, an optical interface, a coaxial interface, or the like. Communication interface 1160 may include a wireless communication device, such as an infrared ("IR") receiver, a Bluetooth® radio, WiFi radio, LTE radio, or the like. The wireless communication device may be coupled to an external device, such as a remote control, a wireless keyboard, a mobile telephone, etc. In some embodiments, device 1100 may include more than one communication interface 1160. For instance, device 1100 may include an optical interface and an Ethernet interface.

Device 1100 may perform certain operations relating to one or more processes described above. Device 1100 may perform these operations in response to processor 1120 executing software instructions stored in a computer-readable medium, such as memory 1130. A computer-readable medium may be defined as a non-transitory memory device. A memory device may include space within a single physical memory device or spread across multiple physical memory devices. The software instructions may be read into memory 1130 from another computer-readable medium or from another device. The software instructions stored in memory 1130 may cause processor 1120 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

We claim:

1. A method comprising:
   receiving, at a robotic planning device, one or more requests for a plurality of objects;
   mapping, by execution of one or more processors of the robotic planning device, the plurality of objects to different locations at which the plurality of objects are stored in a site;
   generating, by execution of the one or more processors, an optimal ordering that minimizes one or more of total distance and total time in retrieving the plurality of objects from the different locations based on distances between different pairs of objects that are computed from the mapping of the plurality of objects;
   identifying a plurality of autonomous robots operating within the site based on wireless messaging exchanged between the robotic planning device and the plurality of autonomous robots;
   determining different amounts of work that each robot of the plurality of autonomous robots performs in a particular amount of time based on different performance characteristics of each robot:
   partitioning, by execution of the one or more processors, the site into a set of clusters that includes one cluster for each robot of the plurality of autonomous robots;
   generating, for a first robot of the plurality of autonomous robots by execution of the one or more processors, a first cluster of the set of clusters to encompass a first region of the site that is of a first size and that includes the locations at which a first set of the plurality of objects in the optimal ordering are stored based on retrieval of the first set of objects according to the optimal ordering equaling a first amount of work that the first robot is determined to perform in the particular amount of time;
   generating, for a second robot of the plurality of autonomous robots by execution of the one or more processors, a second cluster of the set of clusters to encompass a second region of the site that does not overlap with the first region, that is of a different second size, and that includes the locations at which a different second set of the plurality of objects in the optimal ordering are stored based on retrieval of the second set of objects according to the optimal ordering equaling a second amount of work that the second robot is determined to perform in about the same particular amount of time as the first amount of work performed by the first robot; and
   controlling movements and operations of each particular robot of the plurality of autonomous robots based on a different cluster of the set of clusters that the robotic planning device assigns to the particular robot.

2. The method of claim 1 further comprising identifying the performance characteristics associated with each robot of the plurality of autonomous robots.

3. The method of claim 2 further comprising determining, based on the identifying of the performance characteristics, that cumulative time for each robot of the plurality of autonomous robots to retrieve objects in a different cluster of the set of clusters is less than cumulative time for each robot of the plurality of autonomous robots to retrieve the plurality of objects from any location in the site.

4. The method of claim 2, wherein the performance characteristics comprise speed of different robot movements.

5. The method of claim 2 further comprising assigning each cluster of the set of clusters to a different robot of the plurality of autonomous robots based on the performance characteristics of each robot matching requirements associated with objects of an assigned cluster.

6. The method of claim 1, wherein the first set of objects in the first cluster comprises more objects than the second set of objects in the second cluster, and wherein the first cluster is closer to a destination than the second cluster.

7. The method of claim 1 further comprising monitoring the movements and operations of the plurality of autonomous robots, and detecting a failure halting or slowing movements and operations of the first robot.

8. The method of claim 7 further comprising generating a different second set of clusters that allocates retrieval of the plurality of objects to a subset of the plurality of autonomous robots that excludes the first robot.

9. The method of claim 1 further comprising identifying a location of each robot of the plurality of autonomous robots, and assigning each cluster of the set of clusters to a different robot of the plurality of autonomous robots based on the location of the robot being closest to objects associated with an assigned cluster.

10. A method comprising:
receiving, at a robotic planning device, one or more requests for a plurality of objects;
mapping, by execution of one or more processors of the robotic planning device, the plurality of objects to different locations at which the plurality of objects are stored in a site;
identifying different performance characteristics of a plurality of autonomous robots operating within the site;
generating a set of clusters comprising a different sized cluster for each robot of the plurality of autonomous robots based on the different locations of the objects and the different performance characteristics of the plurality of autonomous robots, wherein each cluster of the set of clusters comprises a different number of the plurality of objects pending retrieval from a different region of the site, and wherein generating the set of clusters comprises distributing an equal amount of work across the plurality of autonomous robots with the different performance characteristics by determining an allocation of a different robot from the plurality of autonomous robots to a different cluster from the set of clusters that results in each robot of the plurality of autonomous robots completing retrievals of a different number of the plurality of objects from a different cluster of the set of clusters by a common time; and
operating the plurality of autonomous robots in a coordinated manner based on each robot of the plurality of autonomous robots retrieving a different set of objects from a different cluster of the set of clusters assigned by the robotic planning device.

11. The method of claim 10, wherein said operating comprises retrieving a first set of the plurality of objects with a first robot of the plurality of autonomous robots according to a retrieval ordering provided for the first set of objects in a first cluster of the set of clusters, and retrieving a second set of the plurality of objects with a second robot of the plurality of autonomous robots according to a retrieval ordering provided for the second set of objects in a second cluster of the set of clusters.

12. The method of claim 10, wherein the performance characteristics comprise one or more of speed, acceleration, time to turn, and time to retrieve.

13. The method of claim 10, wherein the performance characteristics are determined from different actuators that vary movements and operations performed by different robots of the plurality of autonomous robots.

14. The method of claim 10, wherein the performance characteristics are determined from different object retrieval parameters that vary objects from the plurality of objects that are retrievable by different robots of the plurality of autonomous robots.

15. A system comprising:
a plurality of objects stored to different locations of a site;
a plurality of autonomous robots operating within the site;
a robotic planning device comprising one or more processors configured to:
receive one or more requests for the plurality of objects;
map the plurality of objects to the different locations;
generate an optimal ordering that minimizes one or more of total distance and total time in retrieving the plurality of objects from the different locations based on distances between different pairs of objects that are computed from the mapping of the plurality of objects;
identify the plurality of autonomous robots operating within the site;
determine different amounts of work that each robot of the plurality of autonomous robots performs in a particular amount of time based on different performance characteristics of each robot;
partition the site into a set of clusters that includes one cluster for each robot of the plurality of autonomous robots;
generate, for a first robot of the plurality of autonomous robots, a first cluster of the set of clusters to encompass a first region of the site that is of a first size and that includes the locations at which a first set of the plurality of objects in the optimal ordering are stored based on retrieval of the first set of objects according to the optimal ordering equaling a first amount of work that the first robot is determined to perform in the particular amount of time;
generate, for a second robot of the plurality of autonomous robots, a second cluster of the set of clusters to encompass a second region of the site that does not overlap with the first region, that is of a different second size, and that includes the locations at which a different second set of the plurality of objects in the optimal ordering are stored based on retrieval of the second set of objects according to the optimal ordering equaling a second amount of work that the second robot is determined to perform in about the same particular amount of time as the first amount of work performed by the first robot; and
control movements and operations of each particular robot of the plurality of autonomous robots based on a different cluster of the set of clusters that the robotic planning device assigns to the particular robot.

16. The system of claim 15, wherein the each of the first and second robots comprises a motorized base and a retrieval element that controllably engages one or more of the plurality of objects.

17. The system of claim 15, wherein the one or more processors are further configured to identify the performance characteristics associated with each robot of the plurality of autonomous robots.

18. The system of claim 17, wherein the one or more processors are further configured to determine, based on the identifying of the performance characteristics, that cumulative time for each robot of the plurality of autonomous robots to retrieve objects in a different cluster of the set of clusters is less than cumulative time for each robot of the plurality of autonomous robots to retrieve the plurality of objects from any location in the site.

19. The system of claim 15, wherein the one or more processors are further configured to assign each cluster of the set of clusters to a different robot of the plurality of autonomous robots based on the performance characteristics of each robot matching requirements associated with objects of an assigned cluster.

\* \* \* \* \*